United States Patent
Fang et al.

(10) Patent No.: US 12,043,686 B2
(45) Date of Patent: Jul. 23, 2024

(54) HIGH MELT INDEX THERMOPLASTIC ELASTOMER AND PREPARATION METHOD THEREFOR

(71) Applicant: ZHEJIANG UNIVERSITY, Hangzhou (CN)

(72) Inventors: Jinwei Fang, Hangzhou (CN); Yingwu Luo, Hangzhou (CN); Xiang Gao, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 883 days.

(21) Appl. No.: 17/055,994

(22) PCT Filed: May 10, 2019

(86) PCT No.: PCT/CN2019/086303
§ 371 (c)(1),
(2) Date: Nov. 17, 2020

(87) PCT Pub. No.: WO2019/218933
PCT Pub. Date: Nov. 21, 2019

(65) Prior Publication Data
US 2021/0253770 A1 Aug. 19, 2021

(30) Foreign Application Priority Data
May 17, 2018 (CN) .......................... 201810474427.3

(51) Int. Cl.
*C08L 53/00* (2006.01)
*C08F 2/00* (2006.01)
*C08F 293/00* (2006.01)

(52) U.S. Cl.
CPC ...... *C08F 293/005* (2013.01); *C08F 2438/03* (2013.01)

(58) Field of Classification Search
CPC .......... C08L 53/00; C08F 2/001; C08F 293/00
See application file for complete search history.

(56) References Cited

U.S. PATENT DOCUMENTS

2011/0207871 A1* 8/2011 Geurts ............... C08F 293/005
524/458

FOREIGN PATENT DOCUMENTS

| CN | 106281147 A | 1/2017 |
| CN | 106433530 A | 2/2017 |

(Continued)

OTHER PUBLICATIONS

International Search Report (PCT/CN2019/086303); Date of Mailing: Aug. 15, 2019.

(Continued)

*Primary Examiner* — Caixia Lu
(74) *Attorney, Agent, or Firm* — W&G Law Group (57) ABSTRACT

Disclosed are a high melt index thermoplastic elastomer and a preparation method therefor. In the present invention, an emulsion polymerization system and a reversible addition chain transfer free radical polymerization technique are used, and a thermoplastic elastomer having a block structure with a high melt index is obtained by means of controlling reaction temperatures of different stages. The present invention is simple in terms of workflow and equipment and energy-saving and environmentally friendly in terms of process, and the raw materials thereof are cheap and easy to obtain, and the resulting high melt index thermoplastic elastomer has an excellent hot workability.

5 Claims, 4 Drawing Sheets (56) References Cited

FOREIGN PATENT DOCUMENTS

| CN | 106905951 | * | 6/2017 |
|---|---|---|---|
| CN | 107418125 A | | 12/2017 |
| CN | 108912288 A | | 11/2018 |
| FR | 2910475 A1 | | 6/2008 |
| JP | 2014221868 A | | 11/2014 |

OTHER PUBLICATIONS

"Polystyrene-block-poly(n-butyl acrylate)-block-polystyrene Triblock Copolymer Thermoplastic Elastomer Synthesized via RAFT Emulsion Polymerization" (Aug. 17, 2010) [Yingwu Luo et al.].

"Synthesis and Redispersibility of Poly(styrene-block-n-butyl acrylate) Core-Shell Latexes by Emulsion Polymerization with RAFT Agent-Surfactant Design" (Feb. 20, 2015) [Feizhou Wang et al.].

"Suppressing the Long-Chain Branching in the Synthesis of Poly-(styrene-b-butyl acrylate-b-styrene) in RAFT Emulsion Polymerization by Tuning the Interfacial Properties" (Feb. 27, 2015) [Yunlong Guo et al.].

* cited by examiner

HIGH MELT INDEX THERMOPLASTIC ELASTOMER AND PREPARATION METHOD THEREFOR

TECHNICAL FIELD

The present invention relates to the field of polymer materials, and particularly, to a block copolymer thermoplastic elastomer with a high melt index and a synthetic method thereof.

BACKGROUND

Thermoplastic elastomer is a new type of polymer material with rubber elasticity at a normal temperature and is suitable for a plastic processing at a high temperature. Most triblock or multiblock copolymers of thermoplastic elastomers are composed of hard segments with a glass transition temperature higher than a working temperature and soft segments with a glass transition temperature lower than a working temperature. The former provides physical cross-linking for polymers and improves the strength of products, while the latter provides good elasticity for products.

A melt index of a polymer reveals the advantages and disadvantages of the hot processing performance thereof. The higher the melt index, the better the hot processing performance of the polymer. The melt index of a polymer is related to molecular weight, branching degree and molecular structure of the polymer. For a block copolymer, the melt index is further related to a compatibility between two blocks. A better compatibility between soft and hard segments leads to a higher melt index. However, thermoplastic elastomers, in order to form microphase separation, need a sufficient driving force from soft and hard segments, so their compatibility is generally poor.

Currently, the living anionic polymerization is commonly used to synthesize block thermoplastic elastomers in industry. However, due to the extremely high requirements for the purity of raw materials and the reaction environment, the synthesis cost is high and there are few suitable monomers. Living/controllable free radical polymerization is a kind of synthesis method developed rapidly in recent decades. This method is widely used in the synthesis of block copolymers because it can not only realize controllable preparation of polymer molecular chains, but also has the advantages of a wide range of applicable monomers and mild reaction conditions. Reversible addition-fragmentation chain transfer polymerization (RAFT) is one of the most promising living/controlled radical polymerization in the industry.

Compared with the solution polymerization and the bulk polymerization, the emulsion polymerization has the advantages such as a fast polymerization speed, a good heat transfer effect and viscosity of the final product, and thus it is the most suitable polymerization method for industrialization. RAFT emulsion polymerization combines the characteristic of controllable activity of the RAFT polymerization and the advantages of high polymerization rate and high molecular weight of products of emulsion polymerization, and thus has great advantages in the synthesis of block copolymers and thermoplastic elastomers. In recent years, RAFT emulsion polymerization has succeeded in a variety of thermoplastic elastomers, among which acrylate polymers have the advantages of a low glass transition temperature, good aging resistance and high polarity, so they are widely used as soft segments of thermoplastic elastomers. However, at the conventional emulsion polymerization temperature, i.e., in a range of 50-80° C., the acrylate thermoplastic elastomer synthesized by RAFT emulsion polymerization generally has the disadvantages such as a low melt index and poor processability, and the melt index is generally lower than 0.01 g/10 min. The low melt index limits the application of acrylate thermoplastic elastomers and greatly increases the processing cost of thermal processing.

SUMMARY

The purpose of the present application is, aiming at the disadvantages of the prior art, to provide a polar thermoplastic elastomer with a high melt index and a preparation method thereof.

The above purpose is realized with the following technical solution: a thermoplastic elastomer with a high melt index, the thermoplastic elastomer has a structural general formula of $X\text{-}AA_{n_1}\text{-}b\text{-}St_{n_2}\text{-}b\text{-}\alpha_{n_3}\text{-}b\text{-}(\beta\text{-}co\text{-}\gamma)_{n_4}\text{-}b\text{-}\alpha_{n_5}\text{-}R$, wherein X is isopropionyloxy, acetoxy, 2-cyanoacetoxy or 2-aminoacetoxy; in $AA_{n_1}$, AA is a monomer unit of methacrylic acid or a monomer unit of acrylic acid, $n_1$ is an average polymerization degree of AA, where $n_1$=20-60; in $St_{n_2}$, St is a monomer unit of styrene, $n_2$ is an average polymerization degree of St, where $n_2$=3-10; in $\alpha_{n_3}$, $\alpha$ is a monomer unit of styrene, methyl methacrylate (MMA) or acrylonitrile (AN), $n_3$ is an average polymerization degree of $\alpha$, where $n_3$=50-200; in $(\beta\text{-}co\text{-}\gamma)_{n_4}$, $\beta\text{-}co\text{-}\gamma$ is a random copolymer of $\beta$ and $\gamma$, $\beta$ is a monomer unit of methyl acrylate (MA), ethyl acrylate (EA), butyl acrylate (BA), tert-butyl acrylate (BA), isobutyl acrylate (iBA) or 2-ethylhexyl acrylate (EHA), $\gamma$ is a monomer unit of butyl methacrylate (BMA), tert-butyl methacrylate (tBMA), isobutyl methacrylate (iBMA) or 2-ethylhexyl methacrylate (EHMA), $n_4$ is an average polymerization degree of a $\beta\text{-}co\text{-}\gamma$ copolymer, where $n_4$=200-1000, and a weight ratio of $\gamma$ to $\beta$ in the $\beta\text{-}co\text{-}\gamma$ copolymer is 0:1-3:1; in $\alpha_{n_5}$, $\alpha$ is a monomer unit of styrene, methyl methacrylate or acrylonitrile, $n_5$ is an average polymerization degree of $\alpha$, and $n_5$=50-200; R is an alkyl dithioester group or an alkyl trithioester group; a melt index of the thermoplastic elastomer measured at 190° C. and 2.16 kg is 0.5 to 10 g/10 min.

The present application further provides a preparation method of the thermoplastic elastomer described above, and the method comprises the following steps: a step (1) of dissolving, under stirring, 0.6-3 parts by weight of an amphiphilic macromolecule reversible addition-fragmentation chain transfer reagent in 50-100 parts by weight of water, adding 5-15 parts by weight of $\alpha$ monomers under stirring, and pre-emulsifying and adding into a reactor; heating the reactor to 30-80° C., keeping stirring, introducing nitrogen and removing oxygen for more than 5 minutes; adding 0.014-0.1 part by weight of a first water-soluble initiator to the reaction system; after reacting for about 30-60 minutes, adding 20-40 parts by weight of an aqueous solution of sodium hydroxide containing 0.05-0.2 part by weight of sodium hydroxide, and allowing the reaction to continue for about 30-60 minutes to obtain a block copolymer of $X\text{-}AA_{n_1}\text{-}b\text{-}St_{n_2}\text{-}b\text{-}\alpha_{n_3}\text{-}R$, which, in form of particles, is stably dispersed in water to form a latex; a step (2) of adjusting the reaction temperature to 30-60°C, adding 15-30 parts by weight of $\beta$ monomer and 0-45 parts by weight of $\gamma$ monomer; subsequently, adding 0.014 to 0.1 part by weight of a second water-soluble initiator and reacting for 90 to 240 minutes to obtain a block copolymer of $X\text{-}AA_{n_1}\text{-}b\text{-}St_{n_2}\text{-}b\text{-}\alpha_{n_3}\text{-}b\text{-}(\beta\text{-}co\text{-}\gamma)_{n_4}\text{-}R$, which, in form of particles, is stably dispersed in water to form a latex; a step (3) of adding 5-15 parts by weight of a monomers, and continuing the reaction for about 90-240 minutes at a reaction temperature of 30-60° C., thus obtaining a block copolymer of X-AA$_{n1}$-b-St$_{n2}$-b-α$_{n3}$-b-(β-co-γ)$_{n4}$-b-α$_{n5}$-R, which, in form of particles, is stably dispersed in water to form a latex; and a step (4) of demulsifying, washing and drying the obtained latex to obtain the thermoplastic elastomer with a high melt index.

Further, the amphiphilic macromolecule reversible addition-fragmentation chain transfer reagent has the following structural formula:

wherein Z is C4-C12 alkylthio, C4-C12 alkyl, C4-C12 phenyl or C4-C12 benzyl; S is sulfur; St is a monomer unit of styrene; AA is a monomer unit of methacrylic acid or a monomer unit of acrylic acid; and X is isopropionyloxy, acetoxy, 2-cyanoacetoxy or 2-aminoacetoxy; n$_6$ is an average polymerization degree of the monomer unit of styrene, n$_6$=3-10, n$_7$ is an average polymerization degree of the monomer unit of methacrylic acid or the monomer unit of acrylic acid, and n$_7$=20-60.

Further, the first water-soluble initiator is a derivative of ammonium persulfate, potassium persulfate, hydrogen peroxide or hydrogen peroxide; the second water-soluble initiator is 2,2'-azobis[2-methylpropionamidine] dihydrochloride (V50), 1,2-bis(2-(4,5-dihydro-1H-imidazol-2-yl)propan-2-yl)diazene dihydrochloride (VA044), 2-hydroxy-4'-(2-hydroxyethoxy)-2-methylpropiophenone (2959), sodium hydrogen persulfate/potassium persulfate redox initiator or sodium persulfate/ammonium persulfate redox initiator.

The present application has the following beneficial effects. In the present application, an emulsion polymerization system is adopted in combination with the reversible addition-fragmentation chain transfer free radical polymerization technology, and a triblock-structure thermoplastic elastomer with a high melt index is obtained by reducing the reaction temperature and copolymerizing in a soft segments.

1. The emulsion polymerization has many advantages such as low viscosity, high heat transfer efficiency and less pollution, facilitating industrialization and continuous production;

2. The emulsion polymerization has an isolation effect on free radicals, and the free radical in different particles do not react with each other, and the rate of free radical termination is reduced;

3. An amphiphilic macromolecular reversible addition-fragmentation chain transfer reagent serves as a chain transfer reagent and an emulsifier at the same time, so that the molecular structure and distribution of the final product can be well controlled, and the complex operation of removing the added emulsifier in the subsequent process is avoided;

4. The polymer synthesized by the method has a controllable molecular weight, a narrow molecular weight distribution and a wide monomer application range;

5. Compared with the product obtained by the traditional RAFT emulsion polymerization, the thermoplastic elastomer product obtained in the present application has a higher melt index, excellent thermal processing property and good viscoelastic property.

DESCRIPTION OF EMBODIMENTS

Applicant found that when the reaction temperature of the RAFT emulsion polymerization is reduced to 30-60° ° C. from the traditional 50-80° C., the melt index of the obtained acrylate triblock thermoplastic elastomer is greatly improved; meanwhile, by copolymerizing a part of monomers, which have a better compatibility with the hard segment and a similar structure with the soft segment, into the soft segment of acrylate monomers, the melt index of the thermoplastic elastomer can be effectively enhanced, while the viscoelasticity, polarity and other properties of the polymer are not greatly affected. The final product not only has excellent elastic property and high strength as a thermoplastic elastomer, but also has high polarity, and more importantly, the processability is significantly improved.

The present application provides a preparation method of the thermoplastic elastomer with a high melt index by reversible addition-fragmentation chain transfer polymerization, comprising the following steps: a step (1) of dissolving, under stirring, 0.6-3 parts by weight of an amphiphilic macromolecule reversible addition-fragmentation chain transfer reagent in 50-100 parts by weight of water, adding 5-15 parts by weight of a monomers under stirring, and pre-emulsifying and adding into a reactor; heating the reactor to 30-80° C., keeping stirring, introducing nitrogen and removing oxygen for more than 5 minutes; adding 0.014-0.1 part by weight of a first water-soluble initiator to the reaction system; after reacting for about 30-60 minutes, adding 20-40 parts by weight of an aqueous solution of sodium hydroxide containing 0.05-0.2 part by weight of sodium hydroxide, and continuing the reaction for about 30-60 minutes to obtain a block copolymer of X-AA$_{n1}$-b-St$_{n2}$-b-α$_{n3}$-R, which, in form of particles, is stably dispersed in water to form a latex; a step (2) of adjusting the reaction temperature to 30-60° ° C., adding 15-30 parts by weight of β monomer and 0-45 parts by weight of γ monomer; subsequently, adding 0.014 to 0.1 part by weight of a second water-soluble initiator and reacting for 90 to 240 minutes to obtain a block copolymer of X-AA$_{n1}$-b-St$_{n2}$-b-α$_{n3}$-b-(β-co-γ)$_{n4}$-R, which, in form of particles, is stably dispersed in water to form a latex; a step (3) of adding 5-15 parts by weight of α monomer, and continuing the reaction for about 90-240 minutes at a reaction temperature of 30-60° C., thus obtaining a block copolymer of X-AA$_{n1}$-b-St$_{n2}$-b-α$_{n3}$-b-(β-co-γ)$_{n4}$-b-α$_{n5}$-R, which, in form of particles, is stably dispersed in water to form a latex; and a step (4) of demulsifying, washing and drying the obtained latex to obtain the thermoplastic elastomer with a high melt index.

The amphiphilic macromolecule reversible addition-fragmentation chain transfer reagent used in the step (1) has the following structural formula:

where, Z is C4-C12 alkylthio, C4-C12 alkyl, C4-C12 phenyl or C4-C12 benzyl; S is sulfur; St is a monomer unit of styrene; AA is a monomer unit of methacrylic acid or a monomer unit of acrylic acid; and X is isopropionyloxy, acetoxy, 2-cyanoacetoxy or 2-aminoacetoxy; $n_6$ is an average polymerization degree of the monomer unit of styrene, $n_6$=3-10, $n_7$ is an average polymerization degree of the monomer unit of methacrylic acid or the monomer unit of acrylic acid, and $n_7$=20-60.

Each monomer has a conversion rate measured by a gravimetric method.

A design molecular weight is calculated in accordance with the following formula:

$$M_{n,th} = \frac{m \cdot x}{[RAFT]} + M_{n,RAFT}$$

where, $M_{n,th}$ indicates a design value of the polymer molecular weight at the end of each step, m indicates a total mass of monomers added in this step, x is a conversion rate, [RAFT] indicates an amount of an amphiphilic reversible addition-fragmentation chain transfer reagent added before the start of the reaction, and $M_{n,RAFT}$ indicates a molecular weight of the amphiphilic reversible addition-fragmentation chain transfer reagent.

The molecular weight of the polymer is characterized by gel permeation chromatography Waters 1525-2414-717GPC, using tetrahydrofuran as eluent and being corrected by a narrow-distribution polystyrene standard sample.

A glass transition temperature of the polymer is measured on DSC Q200, and heated from −50° ° C. to 150° ° C. at a rate of 10° ° C./min in nitrogen atmosphere.

The melt index of the polymer is measured on a melt indexer under the conditions of a temperature of 190° C. and a pressure of 2.16 kg.

The present application is described in detail below with reference to the drawings and examples.

The amphiphilic macromolecule reversible addition-fragmentation chain transfer reagent used in the examples of the present application has the following chemical structural formula:

Amphiphilic macromolecule reversible addition-fragmentation chain transfer reagent (I):

Amphiphilic macromolecule reversible addition-fragmentation chain transfer reagent (II):

Example 1

In a first step: 1.2 parts by weight of an amphiphilic macromolecule reversible addition-fragmentation chain transfer reagent were and dissolved in 70 parts by weight of water under stirring, then 8 parts by weight of St monomers were added, stirred and pre-emulsified and then added into a reactor; the reactor was heated to 70° ° C. while stirring, and nitrogen was introduced to remove oxygen for 30 minutes; 0.03 part by weight of potassium persulfate was added into the reaction system; 30 parts by weight of an aqueous solution sodium of hydroxide containing 0.16 part by weight of sodium hydroxide were added after reacting for 60 minutes, and reaction was continued for 30 minutes to obtain a block copolymer latex of X-$AA_{n1}$-b-$St_{n2}$-b-$St_{n3}$-R.

In a second step: after the reaction in the first step was finished, the reaction temperature was adjusted to 40° C., and 30 parts by weight of BA monomers were added; then, 0.05 part by weight of VA044 was added and reacted for 180 minutes to obtain a block copolymer latex of X-$AA_{n1}$-b-$St_{n2}$-b-$St_{n3}$-b-$BA_{n4}$-R.

In a third step: after the reaction in the second step was finished, 8 parts by weight of St monomers were added, and reaction was continued for 150 minutes; the reaction temperature was 40° C., thereby obtaining a block copolymer latex of X-$AA_{n1}$-b-$St_{n2}$-b-$St_{n3}$-b-$BA_{n4}$-b-$St_{n5}$-R.

In a fourth step: the obtained polymer latex was demulsified, cleaned and dried to obtain a thermoplastic elastomer with a high melt index.

Figure 1:
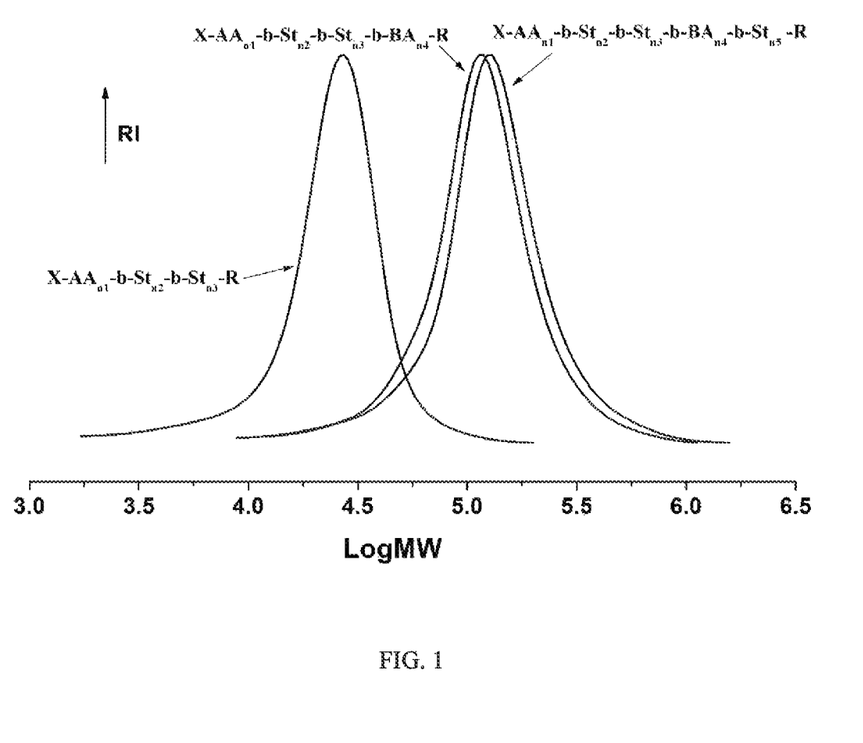
FIG. 1 is a GPC curve of a polymer sample taken at the end of each block in Example 1 of the present application.
Figure 2:
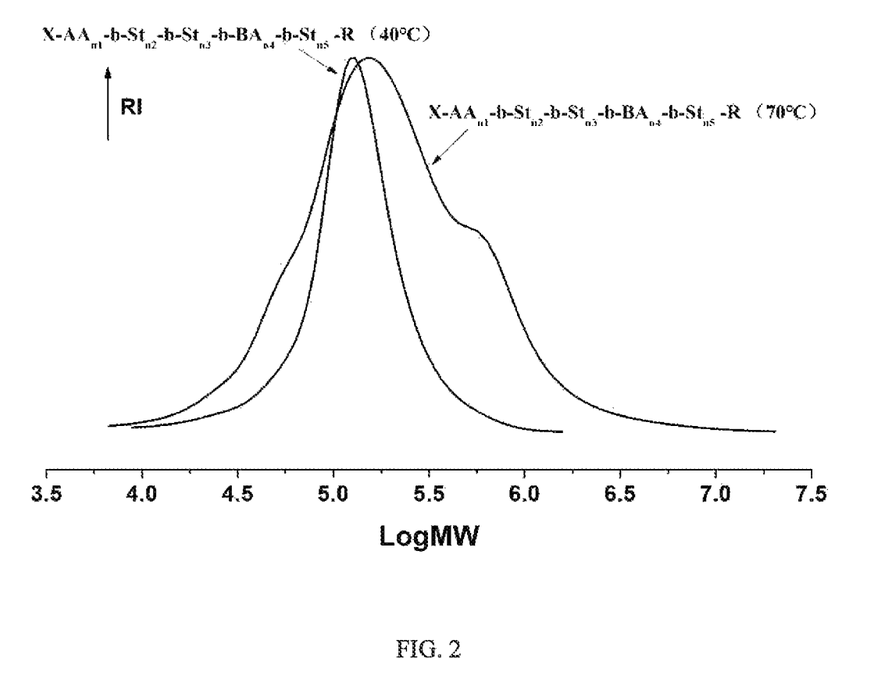
FIG. 2 is a comparison of GPC curves of the block product obtained in Example 1 of the present application and a block product of the same composition obtained by conventional RAFT emulsion polymerization, in which the polymerization temperature for the latter is maintained at 70° C. throughout the reaction.

FIG. 1 illustrates GPC curve of the polymer after each block reaction. It can be seen that the molecular weight of the polymer gradually increases during the polymerization, which proves that the polymer is a block copolymer. The PDI of the product during the whole polymerization process is less than 1.6, indicating that the polymerization process is living polymerization. FIG. 2 compares the GPC curves of the block copolymer with the same composition obtained by RAFT emulsion polymerization at 70° ° C. with that of Example 1, wherein, the reaction temperature for the former is kept at 70° ° C. throughout the reaction. It can be clearly seen that the GPC curve of the triblock copolymer obtained by RAFT emulsion polymerization at 70° C. has a very obvious acromion at a high molecular weight, and the final PDI is greater than 3. However, the final product obtained in Example 1 has no acromion, and the final molecular weight distribution is very narrow. The two polymers are measured in a melt index meter at a temperature of 190° C. and a pressure of 2.16 kg, and the final melt index of the product at 70° C. is below 0.01 g/10 min, whereas the melt index of the product in Example 1 reaches 0.5 g/10 min.

Example 2

In a first step: 1.8 parts by weight of an amphiphilic macromolecule reversible addition-fragmentation chain transfer reagent were dissolved in 70 parts by weight of water under stirring, then & parts by weight of St monomers were added, stirred and pre-emulsified and then added into a reactor; the reactor was heated to 70° ° C. while stirring, and nitrogen was introduced to remove oxygen for 30 minutes; 0.045 part by weight of ammonium persulfate was added into the reaction system; 25 parts by weight of an aqueous solution of sodium hydroxide containing 0.2 part by weight of sodium hydroxide were added after reacting for 60 minutes, and the reaction was continued for 30 minutes to obtain a block copolymer latex of X-$AA_{n1}$-b-$St_{n2}$-b-$St_{n3}$-R;

In a second step: after the reaction in the first step was finished, the reaction temperature was changed to 45° C., and 15 parts by weight of BA monomers and 15 parts by weight of BMA monomers were added; then 0.05 part by weight of VA044 was added to react for 150 minutes to obtain a block copolymer latex of X-$AA_{n1}$-b-$St_{n2}$-b-$St_{n3}$-b-(BA-co-BMA)$_{n4}$-R;

In a third step: after the reaction in the second step was finished, 8 parts by weight of St monomers were added and reaction was continued for 180 minutes, wherein the reaction temperature is 45° C., obtaining a block copolymer latex of X-$AA_{n1}$-b-$St_{n2}$-b-$St_{n3}$-b-(BA-co-BMA)$_{n4}$-b-$St_{n5}$-R;

In a fourth step: the obtained polymer latex was demulsified, cleaned and dried to obtain a thermoplastic elastomer with a high melting index.

Figure 3:
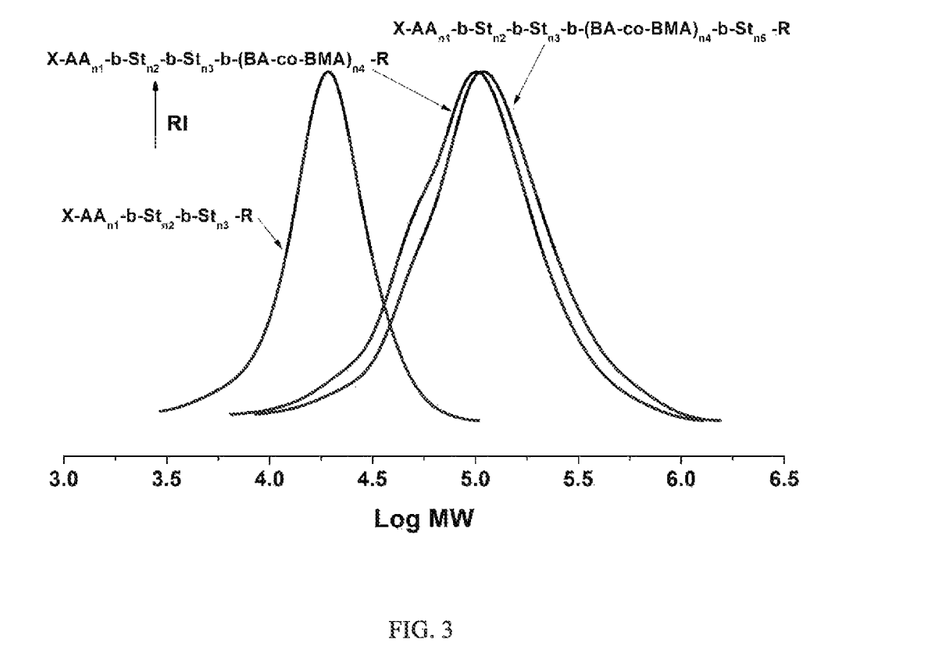
FIG. 3 is a GPC curve of a polymer sample taken at the end of each block in Example 2 of the present application.
Figure 4:
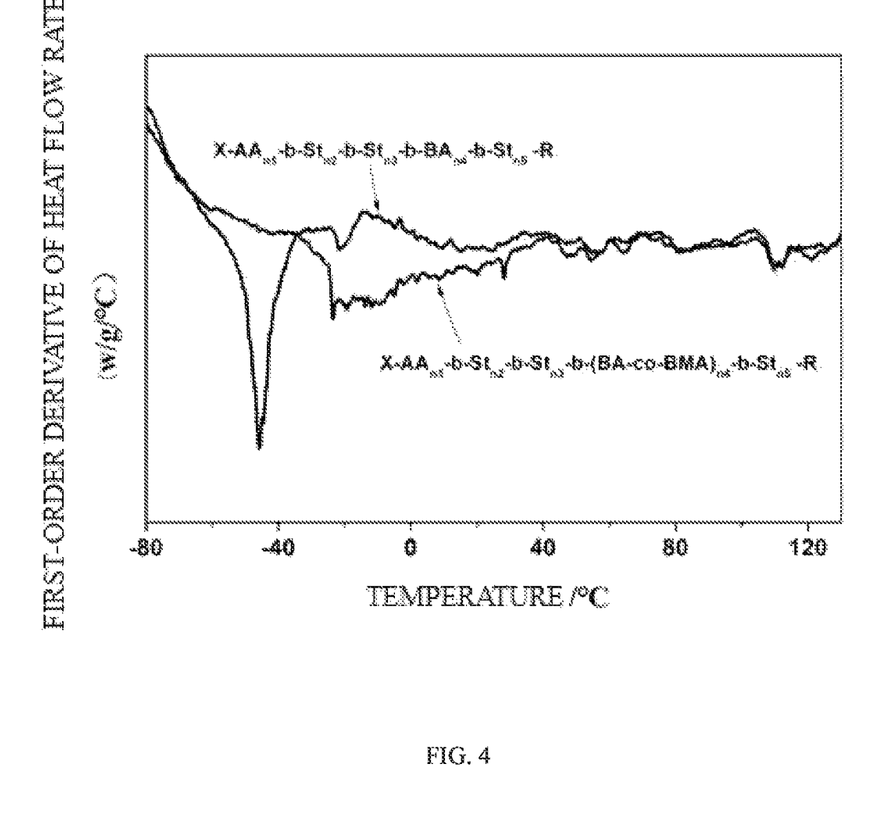
FIG. 4 is a comparison of DSC curves of the products obtained in Example 1 and Example 2 of the present application.

FIG. 3 is a GPC curve of the polymer obtained after each block reaction. It can be seen that the molecular weight of the polymer gradually increases, which proves that the obtained product is a triblock copolymer, and the PDI of the product in the whole polymerization process is less than 1.6, indicating that the polymerization process is living polymerization. FIG. 4 illustrates the comparison of DSC curves of two different triblock copolymers X-$AA_{n1}$-b-$St_{n2}$-b-$St_{n3}$-b-$BA_{n4}$-b-$St_{a5}$-R (the product of Example 1) and X-$AA_{n1}$-b-$St_{n2}$-b-$St_{n3}$-b-(BA-co-BMA)$_{n4}$-b-$St_{n5}$-R (the product of Example 2). It can be seen that the glass transition temperature of the soft segment (the BA segment) of the former is about −50° C., which is close to the glass transition temperature (−56° C.) of the homopolymer PBA, and the range of the glass transition temperature is narrow; in the latter, the glass transition temperature of the soft segment (the BA-co-BMA segment) is increased to about −20° C., which is still far lower than the general room temperature, which meets the requirements for the soft segment of the thermoplastic elastomer. At the same time, the glass transition temperature range is widened, indicating that the compatibility between the soft segment and the hard segment has been improved. The melt index of the finally obtained polymer reaches 1.25 g/10 min under the conditions of a temperature of 190° C. and a pressure of 2.16 kg.

Example 3

In a first step: 0.6 part by weight of an amphiphilic macromolecule reversible addition-fragmentation chain transfer reagent was dissolved in 50 parts by weight of water under stirring, then 5 parts by weight of St monomers were added, stirred and pre-emulsified and then added into a reactor; the reactor was heated to 80° C. while stirring, and nitrogen was introduced to remove oxygen for 15 minutes; 0.014 part by weight of potassium persulfate was added into the reaction system; 20 parts by weight of an aqueous solution of sodium hydroxide containing 0.05 part by weight of sodium hydroxide were added after reacting for 30 minutes, and reaction was continued for 60 minutes to obtain a block copolymer latex of X-$AA_{n1}$-b-$St_{n2}$-b-$St_{n3}$-R;

In a second step: after the reaction in the first step was finished, the reaction temperature was changed to 50° C., and 15 parts by weight of BA monomers and 45 parts by weight of BMA monomers were added; then, 0.014 part by weight of potassium persulfate was added and reacted for 240 minutes to obtain a block copolymer of X-$AA_{n1}$-b-$St_{n2}$-b-$St_{n3}$-b-(BA-co-BMA)$_{n4}$-R, which was stably dispersed in water in form of particles to form a latex.

In a third step: after the reaction in the second step was finished, 5 parts by weight of St monomers were added, and reaction was continued for 90 minutes, wherein the reaction temperature was 50° ° C., so as to obtain a block copolymer latex of X-$AA_{n1}$-b-$St_{n2}$-b-$St_{n3}$-b-(BA-co-BMA)$_{n4}$-b-$St_{n5}$-R;

In a fourth step: the obtained polymer latex was demulsified, washed and dried to obtain a thermoplastic elastomer with a high melt index.

Example 4

In a first step: 3 parts by weight of an amphiphilic macromolecule reversible addition-fragmentation chain transfer reagent were dissolved in 100 parts by weight of water under stirring, then 15 parts by weight of MMA monomers were added, stirred and pre-emulsified and then added into a reactor; the reactor was heated to 30° ° C. while stirring, and nitrogen was introduced to remove oxygen for 50 minutes; 0.1 part by weight of ammonium persulfate was added into the reaction system; 40 parts by weight of an aqueous solution of sodium hydroxide containing 0.2 part by weight of sodium hydroxide were added after reacting for 60 minutes, and reaction was continued for 60 minutes to obtain a block copolymer latex of X-$AA_{n1}$-b-$St_{n2}$-b-$MMA_{n3}$-R;

In a second step: after the reaction in the first step was finished, the reaction temperature was changed to 30° C., and 30 parts by weight of EA monomers and 15 parts by weight of EHMA monomers were added; then 0.1 part by weight of potassium persulfate/sodium sulfite (1:1) redox initiator was added, and reacted for 240 minutes to obtain a block copolymer latex of X-$AA_{n1}$-b-$St_{n2}$-b-$MMA_{n3}$-b-(EA-co-EHA)$_{n4}$-b-$MMA_{n5}$-R;

In a third step: 15 parts by weight of MMA monomers were added after the reaction in the second step, and the reaction was continued for 90 minutes at 30° ° C. to obtain a block copolymer latex of X-$AA_{n1}$-b-$St_{n2}$-b-$MMA_{n3}$-b-(EA-co-EHA)$_{n4}$-b-$MMA_{n5}$-R;

In a fourth step: the obtained polymer latex was demulsified, washed and dried to obtain a thermoplastic elastomer with a high melt index.

Example 5

In a first step: 1.5 parts by weight of an amphiphilic macromolecule reversible addition-fragmentation chain transfer reagent were dissolved in 80 parts by weight of water under stirring, then 10 parts by weight of St monomers were added, stirred and pre-emulsified and then added into a reactor; the reactor was heated to 80° ° C. while stirring, and nitrogen was introduced to remove oxygen for 30 minutes; 0.03 part by weight of potassium persulfate was added into the reaction system; 30 parts by weight of an aqueous solution of sodium hydroxide containing 0.1 part by weight of sodium hydroxide were added after reacting for 30 minutes, and reaction was continued for 30 minutes to obtain a block copolymer latex of X-$AA_{n1}$-b-$St_{n2}$-b-$St_{n3}$-R;

In a second step: after the reaction in the first step was finished, the reaction temperature was changed to 50° C., and 20 parts by weight of BA monomers and 20 parts by weight of BMA monomers were added; then 0.03 part by weight of VA044 was added to react for 90 minutes to obtain a block copolymer latex of $X\text{-}AA_{n1}\text{-}b\text{-}St_{n2}\text{-}b\text{-}St_{n3}\text{-}b\text{-}(BA\text{-}co\text{-}BMA)_{n4}\text{-}R$;

In a third step: 10 parts by weight of St monomers were added after the reaction in the second step, and reaction was continued for 240 minutes at a reaction temperature of 50° ° C. to obtain a block copolymer latex of $X\text{-}AA_{n1}\text{-}b\text{-}St_{n2}\text{-}b\text{-}St_{n3}\text{-}b\text{-}(BA\text{-}co\text{-}BMA)_{n4}\text{-}b\text{-}St_{n5}\text{-}R$;

In a fourth step: the obtained polymer latex was demulsified, washed and dried to obtain a thermoplastic elastomer with a high melting index.

The above embodiments are intended to explain, but not to limit the present application. Any modifications and changes made to the present application within the spirit of the present application and the protection scope of the claims fall into the protection scope of the present application.

What is claimed is:

1. A thermoplastic elastomer with a high melt index, the thermoplastic elastomer having a structural general formula of $X\text{-}AA_{n1}\text{-}b\text{-}St_{n2}\text{-}b\text{-}\alpha_{n3}\text{-}b\text{-}(\beta\text{-}co\text{-}\gamma)_{n4}\text{-}b\text{-}\alpha_{n5}\text{-}R$, wherein X is 1-carboxyethyl; in $AA_{n1}$, AA is a monomer unit of methacrylic acid or a monomer unit of acrylic acid, $n_1$ is an average polymerization degree of AA, where $n_1$=20-60; in $St_{n2}$, St is a monomer unit of styrene, $n_2$ is an average polymerization degree of St, where $n_2$=3-10; in $\alpha_{n3}$, $\alpha$ is a monomer unit of styrene, methyl methacrylate or acrylonitrile, $n_3$ is an average polymerization degree of $\alpha$, where $n_3$=50-200; in $(\beta\text{-}co\text{-}\gamma)_{n4}$, $\beta\text{-}co\text{-}\gamma$ is a random copolymer of $\beta$ and $\gamma$, $\beta$ is a monomer unit of methyl acrylate, ethyl acrylate, butyl acrylate, tert-butyl acrylate, isobutyl acrylate or 2-ethylhexyl acrylate, $\gamma$ is a monomer unit of butyl methacrylate, tert-butyl methacrylate, isobutyl methacrylate or 2-ethylhexyl methacrylate, $n_4$ is an average polymerization degree of a $\beta\text{-}co\text{-}\gamma$ copolymer, where $n_4$=200-1000, and a weight ratio of $\gamma$ to $\beta$ in the $\beta\text{-}co\text{-}\gamma$ copolymer is 0:1-3:1; in $\alpha_{n5}$, $\alpha$ is a monomer unit of styrene, methyl methacrylate or acrylonitrile, $n_5$ is an average polymerization degree of $\alpha$, where $n_5$=50-200; R is an alkyl dithioester group or an alkyl trithioester group; a melt index of the thermoplastic elastomer measured at 190° ° C. and 2.16 kg is 0.5 to [10]1.25 g/10 min.

2. A preparation method of the thermoplastic elastomer according to claim 1, comprising:

a step (1) of dissolving, under stirring, 0.6-3 parts by weight of an amphiphilic macromolecule reversible addition-fragmentation chain transfer reagent in 50-100 parts by weight of water, adding 5-15 parts by weight of α monomers under stirring, and pre-emulsifying and adding into a reactor; heating the reactor to 30° C. to 80° C., keeping stirring, introducing nitrogen and removing oxygen for more than 5 minutes; adding 0.014-0.1 part by weight of a first water-soluble initiator to the reaction system; after reacting for about 30-60 minutes, adding 20-40 parts by weight of an aqueous solution of sodium hydroxide containing 0.05-0.2 part by weight of sodium hydroxide, and allowing the reaction to continue for about 30-60 minutes to obtain a block copolymer of $X\text{-}AA_{n1}\text{-}b\text{-}St_{n2}\text{-}b\text{-}\alpha_{n3}\text{-}R$, which, in form of particles, is stably dispersed in water to form a latex;

a step (2) of adjusting the reaction temperature to 30-60° C., adding 15-30 parts by weight of β monomer and 0-45 parts by weight of γ monomer; subsequently, adding 0.014 to 0.1 part by weight of a second water-soluble initiator and reacting for 90 to 240 minutes to obtain a block copolymer of $X\text{-}AA_{n1}\text{-}b\text{-}St_{n2}\text{-}b\text{-}\alpha_{n3}\text{-}b\text{-}(\beta\text{-}co\text{-}\gamma)_{n4}\text{-}R$, which, in form of particles, is stably dispersed in water to form a latex;

a step (3) of adding 5-15 parts by weight of α monomer, and continuing the reaction for about 90-240 minutes at a reaction temperature of 30-60° C., thus obtaining a block copolymer of $X\text{-}AA_{n1}\text{-}b\text{-}St_{n2}\text{-}b\text{-}\alpha_{n3}\text{-}b\text{-}(\beta\text{-}co\text{-}\gamma)_{n4}\text{-}b\text{-}\alpha_{n5}\text{-}R$, which, in form of particles, is stably dispersed in water to form a latex; and a step (4) of demulsifying, washing and drying the obtained latex to obtain the thermoplastic elastomer with a high melt index.

3. The preparation method according to claim 2, wherein the amphiphilic macromolecule reversible addition-fragmentation chain transfer reagent has the following structural formula:

wherein Z is C4-C12 alkylthio, C4-C12 alkyl, C4-C12 phenyl or C4-C12 benzyl; S is sulfur; St is a monomer unit of styrene; AA is a monomer unit of methacrylic acid or a monomer unit of acrylic acid; and X is 1-carboxyethyl; $n_6$ is an average polymerization degree of the monomer unit of styrene, $n_6$=3-10, $n_7$ is an average polymerization degree of the monomer unit of methacrylic acid or the monomer unit of acrylic acid, and $n_7$=20-60.

4. The preparation method of reversible addition-fragmentation chain transfer emulsion polymerization according to claim 2, wherein the first water-soluble initiator is a derivative of ammonium persulfate, potassium persulfate, hydrogen peroxide or hydrogen peroxide.

5. The preparation method of reversible addition-fragmentation chain transfer emulsion polymerization according to claim 2, wherein the second water-soluble initiator is 2,2'-azobis[2-methylpropionamidine] dihydrochloride, 1,2-bis(2-(4,5-dihydro-1H-imidazol-2-yl)propan-2-yl)diazene dihydrochloride, 2-hydroxy-4'-(2-hydroxyethoxy)-2-methylpropiophenone, sodium hydrogen persulfate/potassium persulfate redox initiator or sodium persulfate/ammonium persulfate redox initiator.

* * * * *